United States Patent
Matthews et al.

(10) Patent No.: US 11,799,940 B1
(45) Date of Patent: Oct. 24, 2023

(54) TECHNIQUES FOR UPLOAD PRIORITIZATION OF CONTENT

(71) Applicant: Amazon Technologies, Inc., Seattle, WA (US)

(72) Inventors: Jamie Orion Matthews, Seattle, WA (US); Ivan Opalka, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/487,237

(22) Filed: Sep. 28, 2021

(51) Int. Cl.
- H04L 65/80 (2022.01)
- H04L 65/60 (2022.01)
- G06F 16/45 (2019.01)
- G06V 40/16 (2022.01)
- H04L 67/63 (2022.01)

(52) U.S. Cl.
CPC .............. *H04L 65/80* (2013.01); *G06F 16/45* (2019.01); *G06V 40/161* (2022.01); *H04L 65/60* (2013.01); *H04L 67/63* (2022.05)

(58) Field of Classification Search
CPC ......... H04L 47/6275; H04L 2012/6464; H04L 2203/553; H04L 67/63; H04L 65/80; H04L 65/60; H04N 21/44016; H04N 21/278; G06F 16/45
See application file for complete search history.

(56) References Cited

U.S. PATENT DOCUMENTS

| | | | |
|---|---|---|---|
| 6,741,996 B1 * | 5/2004 | Brechner | G06F 16/40 707/999.102 |
| 9,214,191 B2 * | 12/2015 | Guzik | H04N 21/4335 |
| 2013/0282869 A1 * | 10/2013 | Mate | H04W 4/029 709/219 |
| 2014/0189803 A1 * | 7/2014 | Chakra | G06F 3/005 726/4 |
| 2014/0195921 A1 * | 7/2014 | Grosz | G06F 3/126 715/738 |
| 2015/0310031 A1 * | 10/2015 | Kilpatrick | G06F 16/182 707/748 |
| 2019/0273837 A1 * | 9/2019 | Townsend | H04N 1/2108 |
| 2020/0021886 A1 * | 1/2020 | Kawk | H04N 21/4668 |
| 2020/0104278 A1 * | 4/2020 | Kindig | H04N 21/4331 |
| 2020/0104601 A1 * | 4/2020 | Karoui | H04N 5/23203 |
| 2020/0301973 A1 * | 9/2020 | Sewani | G06F 16/9035 |
| 2021/0357426 A1 * | 11/2021 | Beaupre | H04N 21/4825 |

* cited by examiner

*Primary Examiner* — Tonia L Dollinger
*Assistant Examiner* — Mehulkumar J Shah
(74) *Attorney, Agent, or Firm* — Kilpatrick Townsend & Stockton LLP

(57) ABSTRACT

Techniques for optimizing upload prioritization of files between computer systems are described herein. A computer system may assign each file of a plurality of files to one or more groups based at least in part on metadata associated with each file, where each group of the one or more groups is associated with a weight representing a ratio of priority for uploading to a server computer. A prioritized list for a portion of the plurality of files may be generated based at least in part on the one or more groups and associated weights of the one or more groups. One or more files from the prioritized list may be transmitted to the server computer based at least in part on an expiration of a certain time period where the expiration of the certain time period is associated with the transmitting of the content to the server computer.

20 Claims, 7 Drawing Sheets

TECHNIQUES FOR UPLOAD PRIORITIZATION OF CONTENT

BACKGROUND

Users currently capture photos and videos of their family, friends, and pets using a number of computer devices such as their mobile phones, tablets, or digital cameras. Users may seek to save these media files in a more secure storage, such as on a cloud storage system, as the media files may hold significant personal value. Further, users may wish to store captured media files from a capturing device to another device to provide more available storage space on the capturing device. However, transmitting media files from one device to another device or cloud storage system via available networks can be a time intensive process that can utilize much of the device's and connected network's resources. Conventional media file upload techniques may inefficiently utilize device and network resources thereby prolonging the process.

BRIEF DESCRIPTION OF THE DRAWINGS

Various embodiments in accordance with the present disclosure will be described with reference to the drawings, in which.

DETAILED DESCRIPTION

Figure 1:
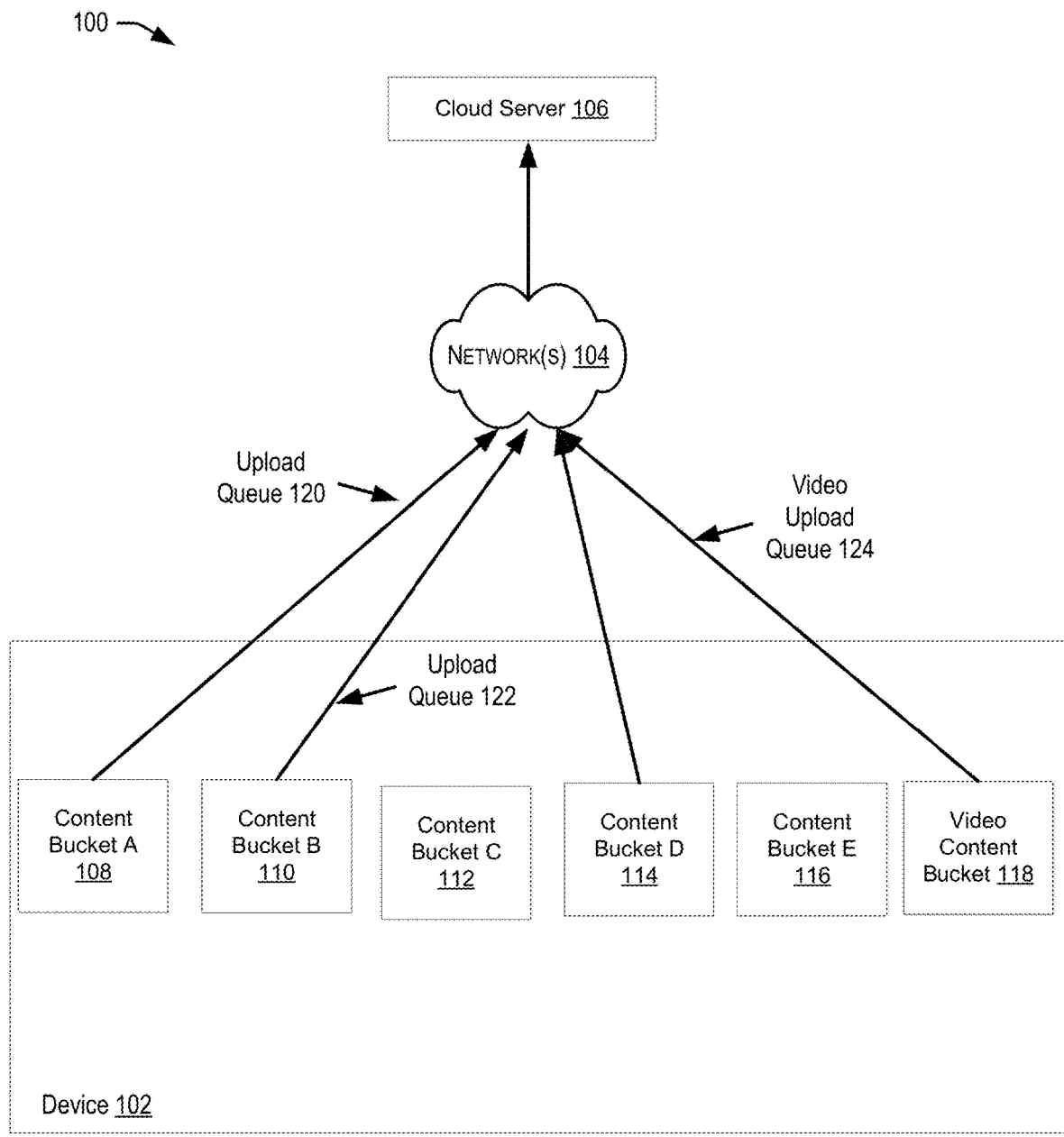
FIG. 1 illustrates a conventional upload prioritization technique used to transmit files from a device to a cloud server via one or more networks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques for optimizing upload prioritization of files between computer systems are described herein. A prioritization feature as described herein is configured to optimize the transmittal or uploading of files between computer systems by prioritizing certain content over other content stored on a computer system. A computer system implementing the prioritization features described herein may be configured to assign files to certain buckets (e.g., content buckets, also referred to as groups) which represent a class of items based on the metadata associated with each file. For example, metadata for a given file may indicate that the file is a video file captured by a user device. As another example, metadata from another given file may indicate that the file is a photo file that has been manually saved to the user device by a user. The computer system may be configured to assign each file to a certain content bucket based on the associated metadata for each file. In accordance with at least one embodiment, each content bucket may be assigned a weight that represents a ratio of priority for uploading the file from said content bucket to another computer in comparison to other content buckets. The weight for each bucket may represent a probability that a next item selected by the computer system for uploading will be selected from a given bucket. For example, if "Bucket A" has an assigned weight of 100 and "Bucket B" has an assigned weight of 25, then items from "Bucket A" would be four times as likely to be selected for upload than items from "Bucket B." The weights would result in a 4:1 ratio of items being uploaded from "Bucket A" as compared to "Bucket B."

In embodiments, the computer system may generate any number of content buckets while defining which metadata files should be included in order to be included in each content bucket. A file may belong to more than one content bucket simultaneously. In accordance with at least one embodiment, the computer system may configure the weights for the content buckets using a configuration file that can be remotely or locally updated as priorities are updated for the content stored on the computer system, or as new content buckets are defined. In a non-limiting example, a user may capture photos and videos of various objects and places with their mobile device. The mobile device may utilize the prioritization features described herein to obtain the metadata of each photo and video of the mobile device and using the metadata assign each file to one or more maintained content buckets. The mobile device may receive a request for content by a remote server computer for backing up the content or synching the content with a cloud storage system. In response, a weight based selection algorithm may generate a prioritized list of items drawn from the one or more content buckets according to each bucket's weight which represents the probability of an item being selected from said content bucket. The computer system may check a current state of the system to ensure upload policies or thresholds are being enforced and then transmit content from the prioritized list of items to the remote server computer via available networks. By utilizing the prioritization features described herein the computer system prioritizes certain types of content over other types of content, while still providing a probability that less probable content will be selected for uploading thereby ensuring a more diverse upload queue scenario. For example, conventional techniques may utilize an absolute priority system where content of a certain priority is uploaded in its entirety before moving onto the next level of priority. However, utilizing such a system can result in inefficient upload times as well as dissatisfaction of a user who may have no input as to the type of priority system being implemented.

In accordance with at least one embodiment, the prioritization feature may include utilizing a maximum file size threshold and a minimum queue threshold. A maximum file size threshold may be enforced by the computer system by calculating, during transmission of files to another computer system, the total file size of all the files concurrently being uploaded. For example, the maximum file size threshold may correspond to 30 MB. If a request for content is being processed and the system determines that the current file size of all uploads equals or exceeds 30 MB then the request for content may not be processed until the total file size falls below 30 MB. In embodiments, the minimum queue threshold may indicate a minimum number of concurrent threads or queues that are to be utilized when uploading content between computer systems. For example, the minimum queue threshold may indicate that at least two concurrent threads or queues should be utilized at all times for transmitting content between computer systems. In embodiments, the minimum queue threshold may override the maximum file size threshold such that if one thread is transmitting a file of 30 MB the computer system may utilize another thread to transmit another file to comply with the minimum queue threshold and go over the maximum file size threshold as the other file would be cause the total file size to exceed the 30 MB limit.

The processes and systems described herein may be an improvement on conventional content upload techniques. For example, conventional content upload techniques may utilize an absolute priority system where certain content is associated with an absolute priority over other content. By utilizing this type of system, certain types of content may never be uploaded as the absolute priority content list may be just grow larger and larger. Content of a different type of priority that a user may wish to see backed up or saved in a remote storage system may not be transmitted for an inordinate amount of time. Conventional upload techniques may utilize queue or thread systems which are locked into each type of content bucket or grouping thereby lacking the flexibility to make comparative judgments between the queues or identify dependency between the queues. Furthermore, a video queue may be utilized which can only be used for uploading videos even when the system has no videos to upload and could use the queue to upload another photo resulting in inefficient utilization of the computer system's resources.

Conventional upload techniques also do not include an easy way to change prioritization between the different types of content, and no remote configuration is applicable in such systems. Instead, priority may be merely determined by date of creation of the file. The prioritization features described herein provide improvements over conventional systems by utilizing weights and ratios of priority for content buckets and selecting content assigned to the content buckets according to the weights. By utilizing the prioritization features described herein, queues or threads do not need to be locked to each type of content bucket, and the prioritization between the content buckets can easily be updated by reassigning weights which results in an update to the ratios of priority between the content buckets. Other thresholds or policies can more easily be enforced (e.g., maximum file size threshold and minimum queue threshold) for ensuring optimal use of a computer system's resources. Moreover, the weights for each content bucket can easily be reassigned and new content buckets can be added without destroying the ratios of probability between the content buckets. The prioritization features described herein may also utilize any available metadata to assign files to content buckets and different algorithms may be used to analyze files for assigning files to certain content buckets. Moreover, the computer system implementing the prioritization features may mark or tag files as they are transmitted to another computer system to ensure that the same file stored in different content buckets is not selected again for uploading.

FIG. 1 illustrates a conventional upload prioritization technique used to transmit files from a device to a cloud server via one or more networks. FIG. 1 depicts a workflow 100 of a conventional upload prioritization technique between a device 102, networks 104, and a cloud server 106.

In workflow 100, the device 102 may maintain a set of non-configurable content buckets (e.g., 108-118). The non-configurable content buckets 108-118 may be assigned files stored on the device 102 without analyzing the metadata associated with the file. Instead, the files may be assigned to the non-configurable content buckets 108-118 according to a naming scheme for the file as it is generated. In conventional upload prioritization techniques, the device 102 may maintain a number of upload queues 120, 122, based on the number of non-configurable content buckets 108-118. Moreover, the device 102 may maintain a separate upload queue (video upload queue 124) for video content assigned to video content bucket 118.

The device 102 which utilizes conventional upload techniques is unable to change the number of queues utilized to upload content to the cloud server 106 via networks 104 based on the resources available to the device 102. For example, the device 102 is unable to utilize the video upload queue 124 to add an upload queue for uploading 6 simultaneous photos (including upload queues 120, 122, and others for each content bucket 112-116) no matter whether the video upload queue 124 even has a video to upload that is stored on device 102. The device 102 instead has no information as to which queues (120, 122, or 124) are being utilized or not utilized at any given time (e.g., there is no dependency between the upload queues (120, 122, 124) maintained by the device 102). The device 102 may be configured to utilize an absolute priority system where Content Bucket A 108 has absolute priority over Content Bucket B 110, Content Bucket B 110 has absolute priority over Content Bucket C 112, and so on.

In such a scenario, if Content Bucket A 108 includes a large amount of files, the files assigned to Content Bucket C 112, for example, may never be transmitted to cloud server 106. This problem is exasperated if more files are continually assigned to Content Bucket A. This can result in a frustrated user who wishes to see files assigned to Content Bucket C 112 saved on the cloud server 106. The device 102 may also lack the capability to add new content buckets to the already existing content buckets (108-118). Conventional upload techniques utilized by the device 102 may not be configured to easily update the absolute priority utilized by the device 102 to select files for uploading to the cloud sever 106. For example, the device 102 may utilize several inefficient steps to change absolute priority from Content Bucket A 108 to Content Bucket D 114, as all other absolute priority relationships between the Content Buckets 108-118 would need to be reconfigured. In conventional upload techniques implemented by device 102, if a file were saved to multiple content buckets (e.g., 108, 110, and 112) the device 102 may select the same file multiple times for uploading as it has no information to indicate which queue is uploading which file to the cloud server 106. This can lead to further inefficiencies when utilizing the resources of device 102 as another file which has not been uploaded yet to cloud server 106 will have to wait until the already uploaded file is done being transmitted before it is selected.

Figure 2:
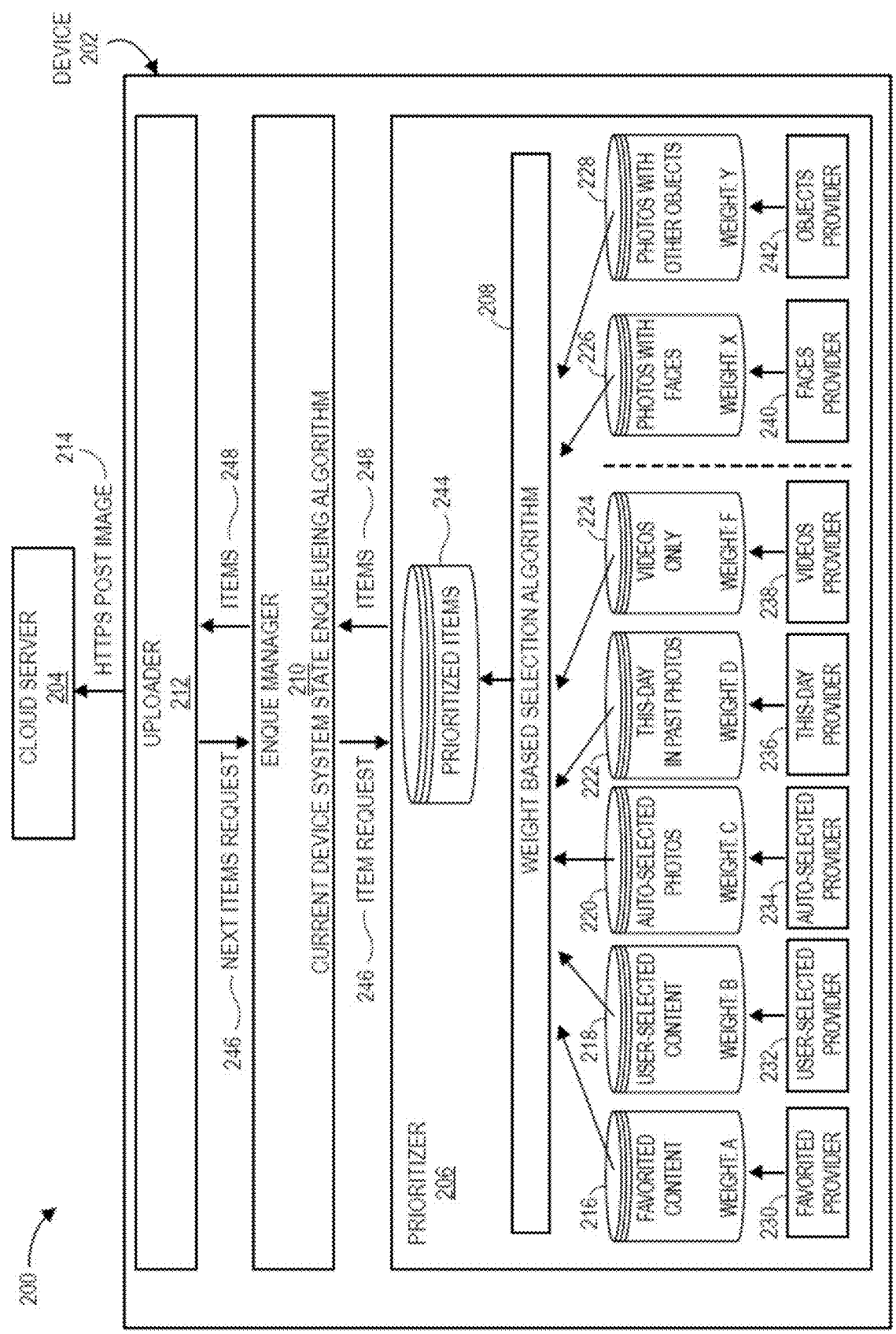
FIG. 2 illustrates an example of a prioritization feature for transmitting files from a device to a cloud server, in accordance with at least one embodiment.

FIG. 2 illustrates an example of a prioritization feature for transmitting files from a device to a cloud server, in accordance with at least one embodiment. FIG. 2 depicts workflow 200 for uploading files from device 202 to cloud server 204 via one or more available networks (not pictured) using the prioritization features described herein. In embodiments, the device 202 may include one or more modules, applications, or algorithms for implementing the prioritization features described herein. For example, device 202 includes Prioritizer 206 which implements a weight based selection algorithm 208, an Enque Manager 210 which determines a current device system state and implements an enqueueing algorithm, and an Uploader 212 which generates requests for items and transmits obtained files to the cloud server 204. In embodiments, the Uploader 212 may transmit the obtained files to the cloud server 204 via HTTPS Post Image messages 214.

The device 202 of FIG. 2 may include one or more content buckets 216-228 each with a different source for the files included in the content bucket 230-242. In accordance with at least one embodiment, the device 202 may be configured to assign files (media files or content) to the various content buckets 216-228 based on the metadata obtained for each file. For example, the Favorited Provider 230 may be a source of files whose metadata indicates that a user has favorited the content associated with the file (e.g., a favorite photo). As depicted in FIG. 2, each content bucket 216-228 includes a different weight which represents a ratio of priority for files from the corresponding content bucket being selected by the weight based selection algorithm 208 when generating a prioritized list 244. In accordance with at least one embodiment, the device 202 and Prioritizer 206 may be configured to implement the weight based selection algorithm 208 which utilizes the weights assigned to each content bucket 216-228 to determine a ratio of priority and thereby determine a probability of selecting a file from a given content bucket according to the ratio. For example, consider a scenario where the device 202 includes only five content buckets, each bucket corresponding to a particular weight or weight value including 10000, 100, 10, 2, and 1. The ratio of items selected from each content bucket when generating the prioritized list 244 would result in the 10000 weighted bucket being selected 100 times, probabilistically, than items from the 100 weighted bucket. The 100 weighted bucket would be 10 times more likely to be selected than the 10 weighted bucket.

Unlike conventional upload prioritization techniques, the prioritization features described herein may add new content buckets to the already existing content buckets 216-228, as well as assign different weights to the content buckets 216-228 resulting in a different ratio of priority between the existing content buckets 216-228. For example, if a user wishes to change the priority between Favorited Content 216 and Auto-Selected photos 220, the configuration file maintained by the device 202 may be edited to change the weights and thereby update the ratio of priority between the two and the other content buckets 218, 22, 224, 226, and 228. In accordance with at least one embodiment, the weight based selection algorithm 208 may be configured to select a given file for generating the prioritized list 244 based on a probability of selecting from a given content bucket according to the weights assigned to each content bucket 216-228. In accordance with at least one embodiment, a file may be assigned to one or more of the content buckets 216-228 based on the metadata associated with the file. The device 202 may be configured to tag, mark, or otherwise indicate that a file has been transmitted to the cloud server 204 such that the weight based selection algorithm 208 will not select a marked or tagged file for inclusion in the prioritized list 244. As files are uploaded to the cloud server 204 the prioritized list 244 may be dynamically updated to select more files from the content buckets 216-228 while excluding already uploaded files.

In accordance with at least one embodiment, uploader 212 may be configured to generate a request for an item 246 in response to a request from the cloud server 204 or it may periodically generate the request for an item 246. The request for an item 246 may be transmitted to the Enque Manager 210 which determines a current device system state for device 202. Determining the current device system state for device 202 may include determining that the concurrent uploads of files to the cloud server 204 are complying with one or more policies or not violating certain thresholds (e.g., maximum file size threshold and minimum queue threshold). For example, the Enque Manager 210 may be configured to determine a number of threads or queues being utilized by the device 202 to upload or transmit files to the cloud server 204 from the prioritized list 244. It should be noted that the prioritization feature described herein and depicted in FIG. 2 may utilize one or more threads or queues to transmit files from the prioritized list 244 to the cloud sever 204. Further, the one or more threads or queues are not tied to the content buckets 216-228 such that the number of threads or queues can be scaled up or down easily and no thread exists purely for transmitting a certain type of content (e.g., no video thread exists which needs to be overwritten to provide a photo).

In accordance with at least one embodiment, the Enque Manager 210 may be configured to determine the total file size of all the files being transmitted to the cloud server 204 to comply with a maximum file size threshold. The Enque Manger 210 may not provide an item 248 to the Uploader 212 in response to the items request 246 if the total file size of all files being transmitted to the cloud sever 204 exceeds the maximum file size threshold. The Enque Manager 210 may provide item 248 even if that item 248 exceeds the maximum file size threshold in order to comply with a minimum queue threshold and ensure that at least two concurrent queues or threads are being utilized to transmit files to the cloud server 204 via uploader 212. In scenarios where the current device system state is in compliance with all thresholds, the Enque Manager 210 may utilize an enqueueing algorithm to provide items 248 to the Uploader 212 from the prioritized list 244. In accordance with at least one embodiment, the device 202 may be configured to utilize an object detection algorithm to detect one or more different types of objects, such as faces (e.g., faces provider 240), in files of device 202. Separate content buckets, such as content bucket 226, may be maintained which include files that further include detected objects such as faces. The content bucket 226 may include its own corresponding weight and be selected by the weight based selection algorithm 208 based on the weight with respect to the weights of the other content buckets (216-224 and 228). The object detection algorithm may be a facial detection algorithm for use in generating a content bucket which includes photos with faces. Photos with faces may be deemed to be higher priority than other content as they may be photos of the user, their friends, or their family. These types of photos may be more important to back up on the cloud server 204 than other photos of the device 202. In accordance with at least one embodiment, the device 202 may utilize one or more algorithms to analyze the files and the content of the files for capture conditions and overall quality. For example, the algorithm may score a file, such as a photo or video, based on one or more factors such as the lighting conditions of the content (e.g., dark or optimal lighting), whether the content is blurry, the orientation of the content, etc.

The score may indicate optimal capture conditions for the content. The device 202 may compare the score of a file to a threshold for inclusion in a separate content bucket such as content bucket 228 for content that is captured under optimal conditions. For example, if the generated score for a file exceeds the threshold then it may be included in a separate content bucket for optimal capture conditions for content where the separate content bucket has a corresponding weight indicating priority with reference to the other content buckets of the device 202. In accordance with at least one embodiment, the device 202 may be configured to comply with a policy that limits the number of videos concurrently being transmitted to cloud sever 204. For example, the policy may indicate that the device 202 is limited to providing only one video at a time in order to make optimal use of the available computer resources and bandwidth of device 202. In embodiments, the current device system state determined by the Enque Manager 210 and device 202 may include obtaining information about the network type currently being utilized by the device 202. For example, the network type may refer to a wireless network connection, a wired network connection, or a cellular network connection. In embodiments, the device 202 and Prioritizer 206 may be configured to update the prioritized list 244 based on the type of network connection being utilized by device 202. For example, a strong wireless network may result in selecting more videos for uploading as opposed to a weaker cellular network may result in more photos being selected (larger file sizes versus smaller file sizes). In embodiments, the device 202 and Prioritizer 206 may be configured to update the prioritized list 244 based on updates to the weights of the content buckets 216-228 or based on newly added files to the device 202.

Figure 3:
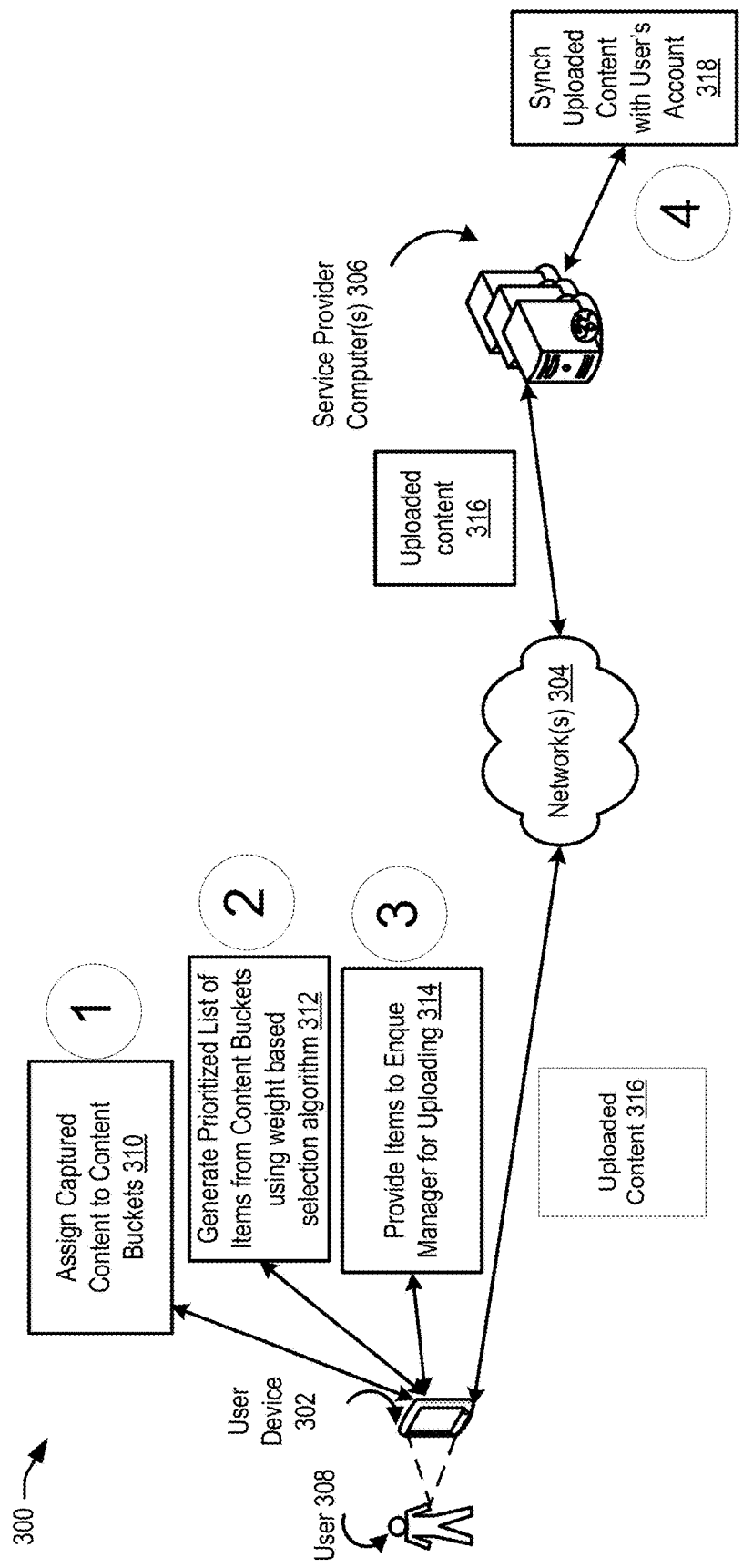
FIG. 3 illustrates an example workflow of a prioritization feature for transmitting files from a user device to service provider computers via one or more networks, in accordance with at least one embodiment.

FIG. 3 illustrates an example workflow of a prioritization feature for transmitting files from a user device to service provider computers via one or more networks, in accordance with at least one embodiment. FIG. 3 depicts workflow 300 for transmitting files from user device 302, via networks 304, to service provider computers 306 using the prioritization features described herein. In workflow 300, a user 308 may utilize user device 302 to capture one or more photos or videos. The user device 302 may be configured to implement the prioritization features described herein. In accordance with at least one embodiment, the user device 302 may be configured to assign captured content (e.g., files of user device 302) to one or more content buckets 310 at Step 1. In embodiments, each content bucket maintained by the user device 302 may be associated with a weight which represents a ratio of priority for uploading files from said bucket to the service provider computers 306 via networks 304. The user device 302 may be configured to generate a prioritized list of items from the content buckets using a weight based selection algorithm 312 at Step 2. In accordance with at least one embodiment, the user device 302 may receive an update to a locally maintained configuration file periodically which updates the assigned weights to the content buckets 310 from the service provider computers 306 via networks 304. In some embodiments, the user 308 may utilize a user interface or application of user device 302 to configure the weights assigned to the content buckets 310.

In accordance with at least one embodiment, the user device 302 may be configured to provide items to an integrated Enque Manager at Step 3 for uploading 314 items from the prioritized list generated by the weight based selection algorithm 312. The items are depicted in FIG. 3 as uploaded content 316 and may represent files selected from the prioritized list generated by the weight based selection algorithm 312 using the content buckets and weights of the content buckets 310. In embodiments, the user device 302 may be configured to respond to a request for content from the service provider computers 306 by providing the uploaded content 316. In some embodiments, the user device 302 may periodically attempt to provide the uploaded content 316 to the service provider computers 306 via networks 304 absent a request. In accordance with at least one embodiment, the user 308 may interact with an application of user device 302 to provide user input which corresponds to transmitting files or uploading content 316 from the user device 302 to the service provider computers 306 via networks 304. In accordance with at least one embodiment, the user device 302 may be configured to maintain a certain time period(s) upon expiration of which causes the user device 302 to transmit the files or upload content 316 from the user device 302 to service provider computers 306 via networks 304. In embodiments, the user input or the expiration of the certain time period(s) may cause the user device 302 to transmit the files (uploaded content 316) to the service provider computers 306 via networks 304 absent a request for content from the service provider computers 306. In embodiments, an operating system of the user device 302 may be configured to maintain the certain time period(s) and interact with the application of the user device 302 to upload the content 316 to the service provider computers 306 via networks 304. In embodiments, the uploaded content 316 may include information about the user 308 and/or the user device 302 for use in associating the files included in the uploaded content 316 with an appropriate account maintained by the service provider computers 306 (e.g., a user profile which corresponds to the user 308 and/or user device 302). The service provider computers 306 may be configured to synch 318 the uploaded content 316 with the user's account at Step 4. For example, the service provider computers may be configured to synch the uploaded content 316 to a cloud storage system maintained or in communication with the service provider computers 306.

Figure 4:
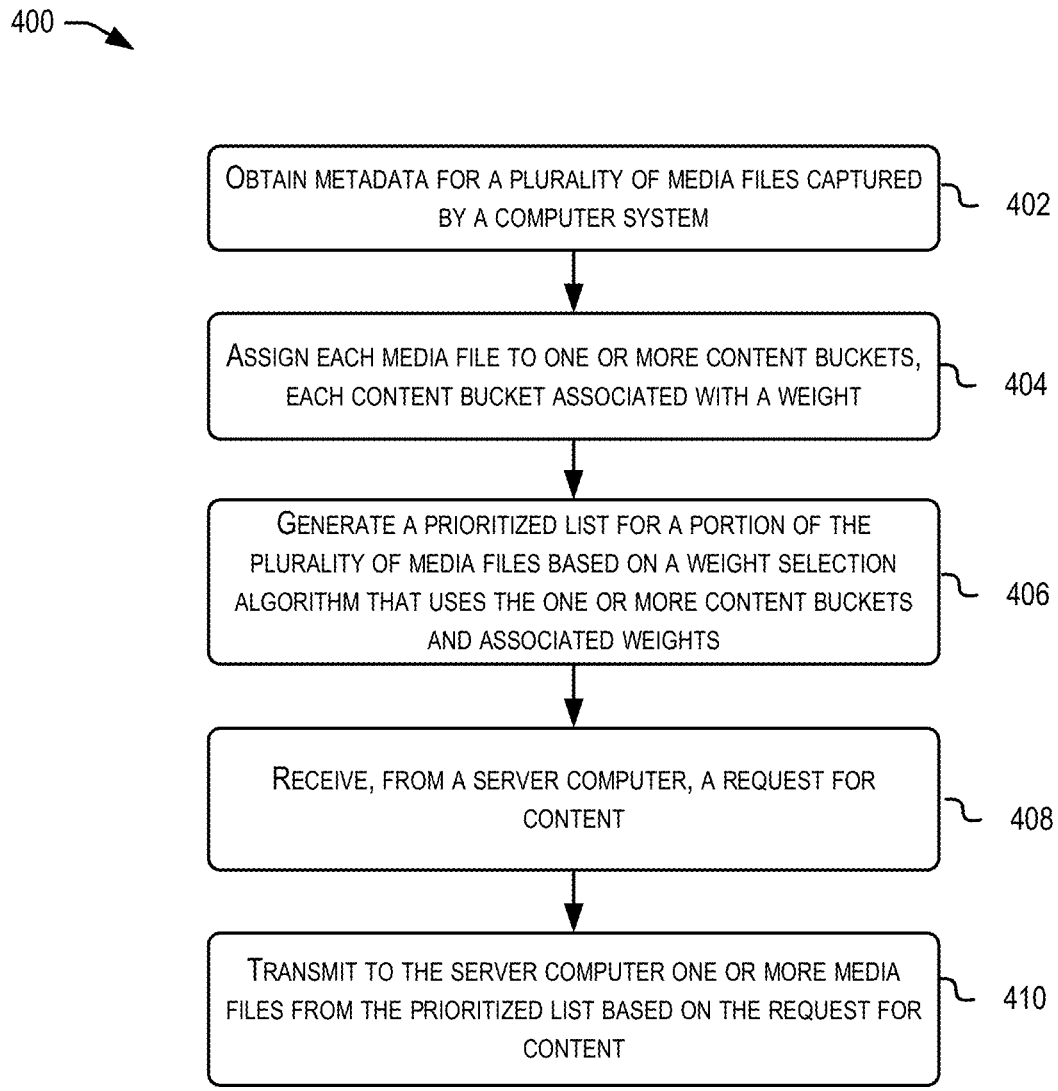
FIG. 4 illustrates an example flow chart for a prioritization feature, in accordance with at least one embodiment.
Figure 5:
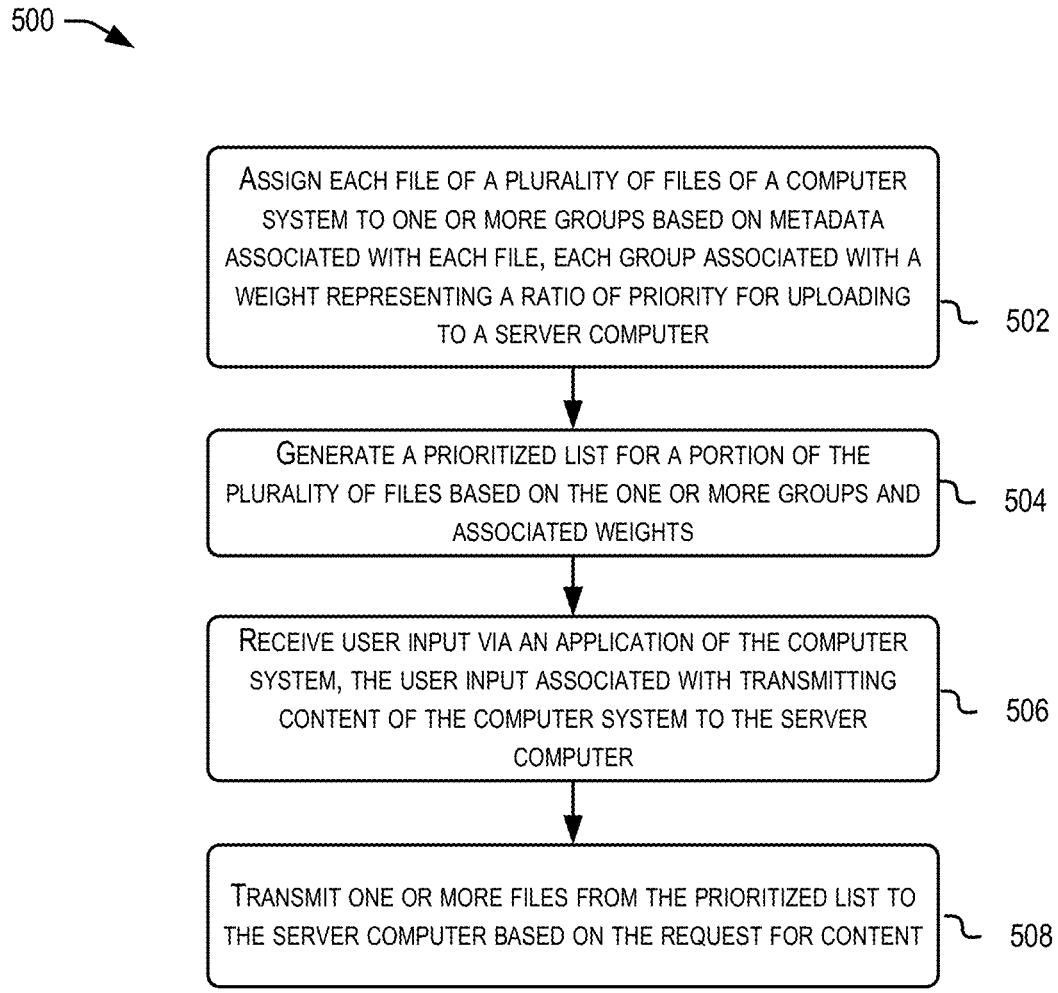
FIG. 5 illustrates an example flow chart for a prioritization feature, in accordance with at least one embodiment.

FIGS. 4 and 5 illustrate example flow charts for prioritization features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 6:
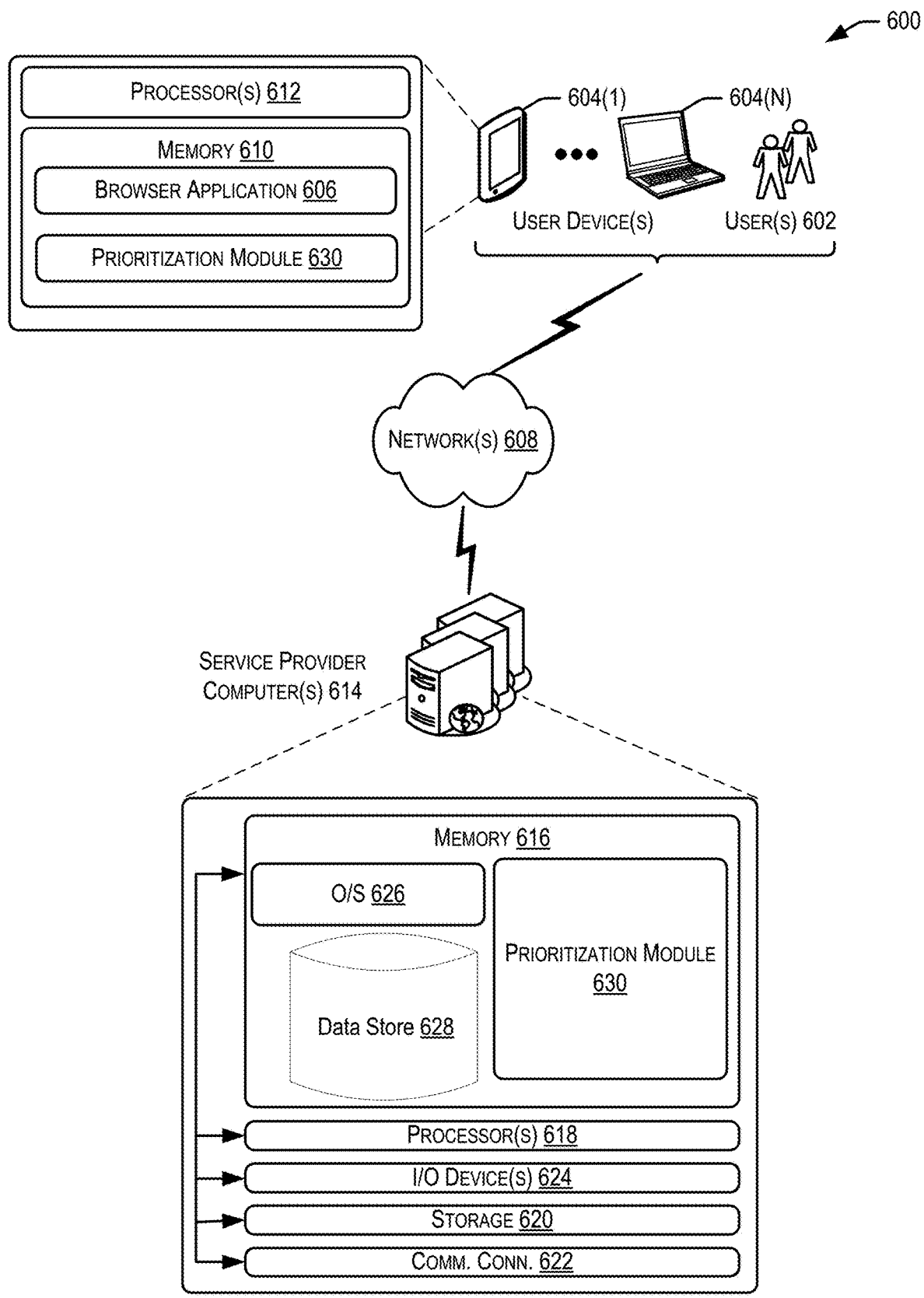
FIG. 6 illustrates an example architecture for implementing a prioritization feature, in accordance with at least one embodiment.

In some examples, user devices (user device(s) 604) utilizing at least the prioritization module 630 depicted in FIG. 6 may perform the processes 400 and 500 of FIGS. 4 and 5. In FIG. 4, the process 400 may include obtaining metadata for a plurality of media files captured by a computer system at 402. In embodiments, the metadata may indicate a time period associated with when the media file was created. For example, in the case of a photograph file, the time period may indicate when the photo was captured by a user device. The metadata may indicate a category for the media file such as whether it was a media file that was user generated, auto saved or auto selected by the user device, whether it was indicated as favorite content by the user, whether it is a photo or video, or any other suitable file category. The process 400 may include assigning each media file to one or more content buckets where each content bucket is associated with a weight at 404. In embodiments, the weight for a content bucket may represent a ratio of priority for uploading a file belonging to said bucket to a server computer or cloud storage system.

In accordance with at least one embodiment, the process 400 may include generating a prioritized list for a portion of the plurality of media files based at least in part on a weight selection algorithm that uses the one or more content buckets and the associated weights of the one or more content buckets. For example, content bucket A may have an assigned weight of 100 while content bucket B may have an assigned weight of 25. In such a scenario the weight selection algorithm would be four times as likely to select content from content bucket A as from content bucket B. In embodiments, the process 400 includes receiving, from the server computer, a request for content at 408. In embodiments, the server computer may be configured to periodically request content from the user device. In some embodiments, the user device may be configured to periodically attempt to transmit content to the server computer. The process 400 includes transmitting, to the server computer, one or more media files from the prioritized list based on the request for content.

In embodiments, the prioritized list includes files that are ranked according to their priority and selected by the weight based selection algorithm based on the weights assigned to their corresponding content bucket. In accordance with at least one embodiment, the weights assigned to the content buckets may be updated based on input received from a user and/or an entity associated with a service provider of the prioritization features described herein. In accordance with at least one embodiment, the computer system may implement an object detection algorithm for analyzing files for the presence of certain objects such as faces. The computer system may be configured to associate metadata with files that include faces for inclusion in a certain content bucket that corresponds to media with detected faces. In accordance with at least one embodiment, the computer system may be configured to implement an algorithm for scoring certain files based on conditions of the media or quality of the media such as light capture conditions, whether a photo or video is blurry, or other capture conditions or factors during generation of the file. The computer system may be configured to assign certain fails with a score that exceeds a threshold to a particular content bucket which corresponds to media files with good capture conditions or of high quality.

The process 500 may include assigning each file of a plurality of files of a computer system to one or more groups based on metadata associated with each file at 502. In embodiments, each group is associated with a weight representing a ratio of priority for uploading to a server computer. The process 500 may include generating a prioritized list for a portion of the plurality of files based on the one or more groups and associated weights of the one or more groups at 504. The process 500 may include receiving user input via an application of the computer system at 506. In embodiments, the user input may be associated with transmitting content of the computer system to the server computer. The process 500 may include transmitting, to the server computer, one or more files from the prioritized list based at least in part on the request for content at 508. In embodiments, the computer system may utilize one or more upload queues or threads to transmit the files to the server computer.

In embodiments, the computer system may enforce a maximum file size threshold as well as a minimum queue or concurrent thread threshold for transmitting files to the server computer. For example, the computer system may only transmit files utilizing a number of queues or threads up until the total file size of all files being transmitted at a given time does not exceed the maximum file size threshold. As another example, the computer system may be configured to utilize at least two separate and concurrent threads or queues to transmit files to the server computer at any given time in order to comply with the minimum queue or concurrent thread threshold. In embodiments, the computer system may update the prioritized list based at least in part on obtaining new files. For example, more recently captured files may be assigned to a content bucket and the computer system may update the prioritized list utilizing the recently captured or generated files. In embodiments, the computer system may be configured to obtain information which indicates a type of network as well as the bandwidth of the type of network and update the prioritized list based on the network conditions of the computer system.

FIG. 6 illustrates an example architecture for implementing a prioritization feature, in accordance with at least one embodiment. In architecture 600, one or more users 602 (e.g., customers, users, consumers, etc.,) may utilize user computing devices 604(1)-(N) (collectively, user devices 604) to capture files (media files) and transmit files to service provider computers 614 via networks 608. Users 602 may interact with user device 604 and utilize browser application 606 (access a browser application 606 or a user interface (UI) accessible through the browser application 606) to specify weights to associate with one or more content buckets or groupings of files stored in the user device 604. The "browser application" 606 can be any browser control or native application that can access and display a network page or other information such as a user interface of a native software application for enabling the selection or designation of weights for content buckets. A native software application may include an application or program that has been developed for use on a particular platform (such as an operating system) or a particular device (such as a particular type of mobile device or user device 604). In embodiments, the user device 604 may include one or more components for enabling the user 602 to interact with the browser application 606 and capture files such as media files (e.g., one or more cameras, microphones, etc.).

The user devices 604 may include at least one memory 610 and one or more processing units or processor(s) 612. The memory 610 may store program instructions that are loadable and executable on the processor(s) 612, as well as data generated during the execution of these programs. Depending on the configuration and type of the user devices 604, the memory 610 may be volatile (such as random access memory (RAM)) and/or non-volatile (such as read-only memory (ROM), flash memory, etc.). The user devices 604 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 604. In some implementations, the memory 610 may include multiple different types of memory, such as static random access memory (SRAM), dynamic random access memory (DRAM), or ROM.

Turning to the contents of the memory 610 in more detail, the memory 610 may include an operating system and one or more application programs or services for implementing the features disclosed herein. Additionally, the memory 610 may include one or more modules for implementing the features described herein including the prioritization module 630. In embodiments, the prioritization module 630 may be configured to obtain or analyze metadata of files of the user device 604 (e.g., captured photos or videos) for assigning each file to one or more content buckets generated and maintained by the prioritization module 630 and user device 604. In embodiments, the prioritization module 630 may utilize one or more algorithms and/or modules (not pictured) for implementing the prioritization features described herein. The prioritization module 630 may utilize a prioritize module and an implemented weight based selection algorithm to generate a prioritized list of items (e.g., files). The prioritized list of items may include one or more files selected from the one or more content buckets by the weight based selection algorithm. In embodiments, the prioritization module may implement an enque manager for determining a current device system state and implementing an enqueing algorithm. In embodiments, the current device system state may refer to a state of the resources being utilized by the user device 604 for transmitting files to the service provider computers 614. For example, the state may include a number of concurrent threads for transmitting files to the service provider computers 614, a total file size of the files being transmitted to the service provider computers 614, a network type utilized by the user device 604 and/or a current network speed of networks 608. In embodiments, the enque manager may request an item from the prioritizer in response to a request from an uploader of the prioritization module 630. The enque manager may receive the item from the prioritizer and transmit the item to the uploader for transmittal, via one or more threads, to the service provider computers 614 via networks 608. In embodiments, the prioritization module 630 may be configured to tag or otherwise mark a file once it has been transmitted to the service provider computers 614, as a given file may be assigned to one or more content buckets based on its associated metadata. A tagged or marked file will not be selected for an item request by the prioritizer in response to a request from the enque manger.

The architecture 600 may also include one or more service provider computers 614 that may, in some examples, provide computing resources such as, but not limited to, client entities, low latency data storage, durable data store, data access, management, virtualization, hosted computing environment or "cloud-based" solutions, electronic content performance management, etc. The service provider computers 614 may implement or be an example of the service provider computer(s) described herein with reference to FIGS. 1-5 and throughout the disclosure. The one or more service provider computers 614 may also be operable to provide site hosting, computer application development, and/or implementation platforms, combinations of the foregoing, or the like to the one or more users 602 via user devices 604.

In some examples, the networks 608 may include any one or a combination of many different types of networks, such as cable networks, the Internet, wireless networks, cellular networks, and other private and/or public networks. While the illustrated examples represents the users 602 communicating with the service provider computers 614 over the networks 608 via user devices 604, the described techniques may equally apply in instances where the users 602 interact with the one or more service provider computers 614 via the one or more user devices 604 over a landline phone, via a kiosk, or in any other manner. It is also noted that the described techniques may apply in other client/server arrangements (e.g., set-top boxes, etc.), as well as in non-client/server arrangements (e.g.., locally stored applications, peer-to-peer arrangements, etc.).

The one or more service provider computers 614 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 614 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 614 may be in communication with the user device 604 via the networks 608, or via other network connections. The one or more service provider computers 614 may include one or more servers, perhaps arranged in a cluster or as individual servers not associated with one another.

In one illustrative configuration, the one or more service provider computers 614 may include at least one memory 616 and one or more processing units or processor(s) 618. The processor(s) 618 may be implemented as appropriate in hardware, computer-executable instructions, firmware, or combination thereof. Computer-executable instruction or firmware implementations of the processor(s) 618 may include computer-executable or machine-executable instructions written in any suitable programming language to perform the various functions described when executed by a hardware computing device, such as a processor. The memory 616 may store program instructions that are loadable and executable on the processor(s) 618, as well as data generated during the execution of these programs. Depending on the configuration and type of the one or more service provider computers 614, the memory 616 may be volatile (such as RAM) and/or non-volatile (such as ROM, flash memory, etc.). The one or more service provider computers 614 or servers may also include additional storage 620, which may include removable storage and/or non-removable storage. The additional storage 620 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 616 may include multiple different types of memory, such as SRAM, DRAM, or ROM.

The memory 616, the additional storage 620, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 616 and the additional storage 620 are all examples of non-transitory computer storage media. Additional types of non-transitory computer storage media that may be present in the one or more service provider computers 614 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 614. Combinations of any of the above should also be included within the scope of non-transitory computer-readable media.

The one or more service provider computers 614 may also contain communication connection interface(s) 622 that allow the one or more service provider computers 614 to communicate with a data store, another computing device or server, user terminals, and/or other devices on the networks 608. The one or more service provider computers 614 may also include I/O device(s) 624, such as a keyboard, a mouse, a pen, a voice input device, a touch input device, a display, speakers, a printer, etc.

Turning to the contents of the memory 616 in more detail, the memory 616 may include an operating system 626, one or more data stores 628, and/or one or more application programs or services for implementing the features disclosed herein including the prioritization module 630. In accordance with at least one embodiment, the prioritization module 630 may be configured to maintain the weights assigned to content buckets, synchronize received files from the user devices 604 to user accounts, and generate requests for files from the user device 604. In embodiments, the user devices 604 may be configured to periodically attempt to transmit files to the service provider computers 614 via networks 608 or the service provider computers 614 may periodically request files from the user devices 604 via networks 608. In embodiments, the service provider computers 614 may generate a response indicating successful upload, storage, and/or synchronization with a user account of received files from the user device. The response may be transmitted to the user device 604 via networks 608 and configured to be presented via user device 604 and browser application 606.

Figure 7:
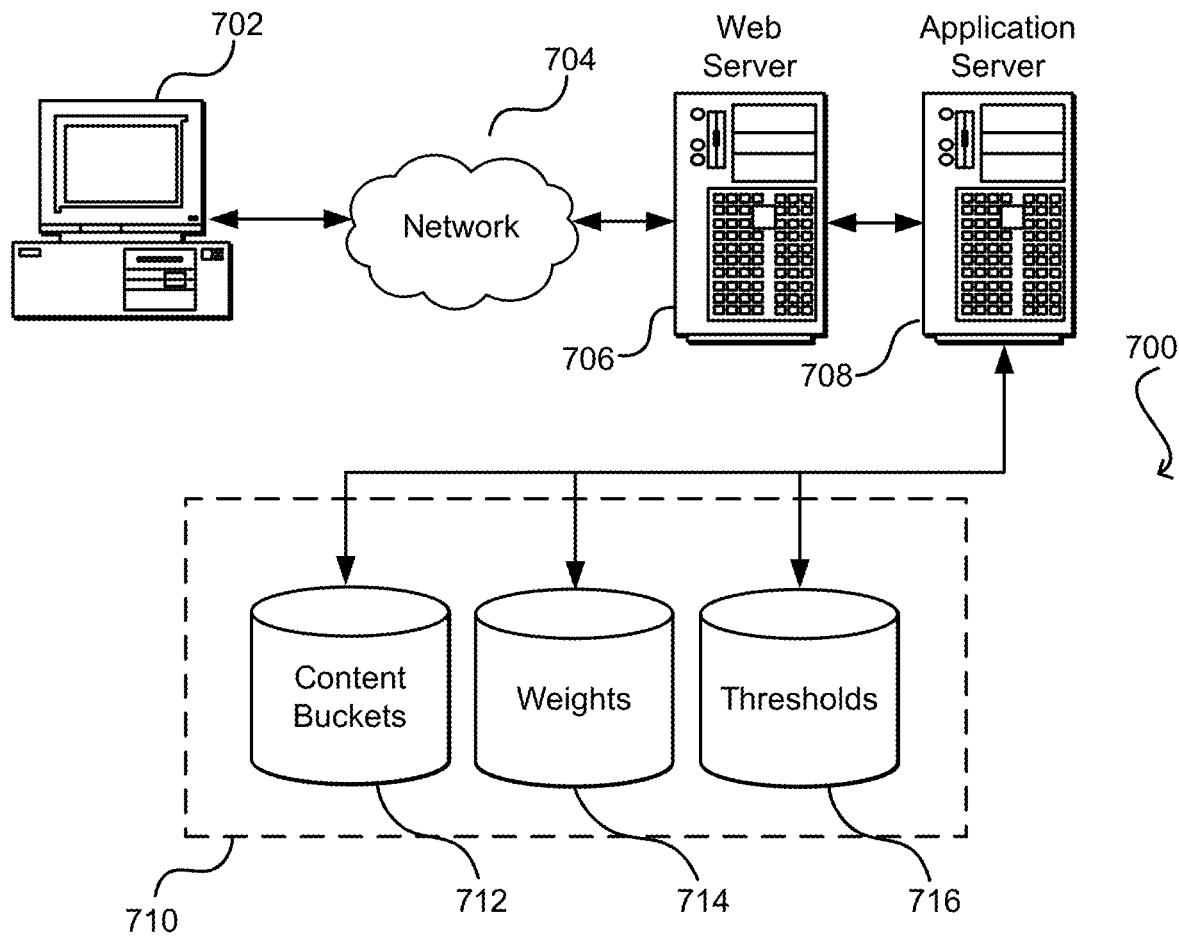
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information such as media files (files) over an appropriate network 704 and convey information back to a user of the device. Examples of such client devices include personal computers, cell phones, handheld messaging devices, laptop computers, set-top boxes, personal data assistants, electronic book readers, and the like. The network 704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network 704 can be enabled by wired or wireless connections and combinations thereof. In this example, the network 704 includes the Internet, as the environment includes a Web server 706 for receiving requests or files, and serving content or storing files in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content or files between the client device 702 and the application server 708, can be handled by the Web server 708. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store 710 illustrated includes mechanisms for storing generated content buckets 712 and thresholds 716, which can be used to serve content for the production side or generate requests for files for storing or synching data from the client device 702 with a storage account or cloud storage maintained in the data store 710. The data store 710 also is shown to include a mechanism for storing weights 714, which can be used for maintaining the weights or probability ratios assigned to the content buckets stored in 712. The weights 714 may be modified by an entity interacting with the web server 706, the application server 708, or via a portal (web interface or application user interface) presented to a user of the client device 702. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, the application server 708 may send a request for content to the client device 702 via network 704.

In response, the client device 702 may provide one or more files via network 704 for storage in data store 710 to back-up the one or more files in a cloud storage system or synch the data with a storage account associated with the user of client device 702. Information indicating successful transmittal and/or storage of the one or more files by the application sever 708 and data store 710 may be provided to the client device 702.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computer system, metadata for a plurality of media files captured by the computer system, the metadata indicating whether a corresponding media file of the plurality of media files is auto saved to the computer system or auto selected by the computer system;
    assigning, by the computer system, each media file of the plurality of media files to one or more of a plurality of content buckets based at least in part on the metadata for each media file, each particular content bucket being associated with a probability weight representing a relative probability of selection of the particular content bucket for uploading one or more of the media files from the particular content bucket to a server computer;
    generating, by the computer system, a prioritized list of media files based at least in part on a probability weight based selection algorithm that probabilistically selects content buckets according to the associated probability weights of the content buckets, and selects media files for the prioritized list from the probabilistically selected content buckets;
    receiving, by the computer system and from the server computer, a request for content; and
    transmitting, by the computer system and to the server computer, one or more media files from the prioritized list based at least in part on the request for content.

2. The computer-implemented method of claim 1, wherein the metadata further indicates a category of each media file.

3. The computer-implemented method of claim 1, further comprising updating, by the computer system, probability weights associated with each content bucket of the content buckets based at least in part on received input.

4. The computer-implemented method of claim 1, further comprising implementing, by the computer system, an object detection algorithm to detect faces in the plurality of media files.

5. The computer-implemented method of claim 4, further comprising assigning, by the computer system, media files that have the detected faces to a particular content bucket of the content buckets, the particular content bucket including a corresponding weight.

6. The computer-implemented method of claim 1, further comprising implementing, by the computer system, an algorithm configured to generate a score for each media file based at least in part on one or more quality factors for each media file.

7. The computer-implemented method of claim 6, assigning, by the computer system, media files with scores that exceed a threshold to a particular content bucket of the content buckets, the particular content bucket including a corresponding weight.

8. A computer system comprising:
    a memory configured to store computer-executable instructions; and a processor in communication with the memory configured to execute the computer-executable instructions to at least:

assign each file of a plurality of files of the computer system to one or more of a plurality of groups based at least in part on metadata associated with each file, each particular group associated with a probability weight representing a relative probability of selection of the particular group for uploading one or more of the files of the particular group to a server computer, the metadata indicating whether a corresponding file of the plurality of files is auto saved to the computer system or auto selected by the computer system;

generate a prioritized list of files based at least in part on the probability weights of the groups; and transmit, to the server computer, one or more files from the prioritized list based at least in part on an expiration of a certain time period, the expiration of the certain time period associated with transmitting the one or more files from the prioritized list to the server computer.

9. The computer system of claim 8, wherein the processor in communication with the memory is further configured to execute the computer-executable instructions to at least tag a file of the one or more files in each group of the one or more groups in response to transmitting the file to the server computer from the prioritized list.

10. The computer system of claim 8, wherein the processor in communication with the memory is further configured to execute the computer-executable instructions to at least obtain a type of network utilized by the computer system.

11. The computer system of claim 10, wherein the processor in communication with the memory is further configured to execute the computer-executable instructions to at least update the prioritized list based at least in part on the type of network.

12. The computer system of claim 8, wherein the processor in communication with the memory is further configured to execute the computer-executable instructions to at least obtain the metadata for the plurality of files of the computer system.

13. The computer system of claim 8, wherein the processor in communication with the memory is further configured to execute the computer-executable instructions to at least identify that a portion of the one or more files transmitted to the server computer include a certain number of videos.

14. The computer system of claim 13, wherein the processor in communication with the memory is further configured to execute the computer-executable instructions to at least:

cancel the transmittal of one of the videos of the certain number of videos; and substitute the one of the videos for a photo included in the one or more files from the prioritized list.

15. A non-transitory computer-readable storage medium storing computer-executable instructions that, when executed by a computer system, configure the computer system to perform operations, comprising:

assigning each file of a plurality of files of the computer system to one or more of a plurality of groups based at least in part on metadata associated with each file, each particular group being associated with a probability weight representing a relative probability of selection of the particular group for uploading one or more of the files of the particular group to a server computer, the metadata indicating whether a corresponding file of the plurality of files is auto saved to the computer system or auto selected by the computer system;

generating a prioritized list of files based at least in part on the probability weights of the groups;

receiving user input via an application of the computer system, the user input associated with transmitting content of the computer system to the server computer; and transmitting, to the server computer, one or more files from the prioritized list based at least in part on the user input.

16. The non-transitory computer-readable storage medium of claim 15, wherein transmitting the one or more files to the server computer includes using one or more upload queues.

17. The non-transitory computer-readable storage medium of claim 15, wherein the instructions, when executed by the computer system, further configure the computer system to perform operations comprising maintaining a maximum file size threshold, wherein transmitting the one or more files to the server computer includes selecting the one or more files that have a total file size that does not exceed the maximum file size threshold.

18. The non-transitory computer-readable storage medium of claim 15, wherein the instructions, when executed by the computer system, further configure the computer system to perform operations comprising maintaining a minimum upload queue threshold, wherein transmitting the one or more files to the server computer includes using at least a number of upload queues that exceed the minimum upload queue threshold.

19. The non-transitory computer-readable storage medium of claim 15, wherein the instructions, when executed by the computer system, further configure the computer system to perform operations comprising updating the prioritized list based at least in part on obtaining new files.

20. The non-transitory computer-readable storage medium of claim 15, wherein the instructions, when executed by the computer system, further configure the computer system to perform operations comprising obtaining the metadata for the plurality of files of the computer system.

* * * * *